United States Patent [19]

Takao et al.

[11] Patent Number: 4,672,479
[45] Date of Patent: Jun. 9, 1987

[54] TAPE LOADING/UNLOADING ARRANGEMENT FOR MAGNETIC RECORDING AND/OR REPRODUCING APPARATUS

[75] Inventors: Osamu Takao, Higashiosaka; Minoru Yoshida, Neyagawa; Seiichi Ono, Daito, all of Japan

[73] Assignee: Sanyo Electric Co., Ltd., Osaka, Japan

[21] Appl. No.: 718,305

[22] Filed: Apr. 1, 1985

[30] Foreign Application Priority Data

Apr. 4, 1984 [JP] Japan .............................. 59-50232[U]

[51] Int. Cl.[4] ............................................. G11B 15/60
[52] U.S. Cl. ........................................ 360/95; 360/85
[58] Field of Search .................... 360/95, 85, 130.23, 360/130.22, 130.21, 130.2

[56] References Cited

U.S. PATENT DOCUMENTS

| | | | |
|---|---|---|---|
| 4,015,292 | 3/1977 | Kirn | 360/130.23 |
| 4,017,897 | 4/1977 | Blanding | 360/130.23 |
| 4,092,684 | 5/1978 | Umeda | 360/85 |
| 4,115,825 | 9/1978 | Hayashi et al. | 360/85 |
| 4,122,506 | 10/1978 | Kubo et al. | 360/130 |
| 4,452,407 | 6/1984 | Ogata et al. | 360/132 |
| 4,561,029 | 12/1985 | Maeda | 360/95 |

FOREIGN PATENT DOCUMENTS

| | | | |
|---|---|---|---|
| 57-164468 | 10/1982 | Japan | 360/95 |
| 58-27580 | 6/1983 | Japan | . |
| 59-210559 | 11/1984 | Japan | 360/130.21 |
| 60-52948 | 3/1985 | Japan | 360/130.21 |
| 60-35743 | 8/1985 | Japan | . |

Primary Examiner—John H. Wolff
Assistant Examiner—Matthew J. Bussan
Attorney, Agent, or Firm—Armstrong, Nikaido, Marmelstein & Kubovcik

[57] ABSTRACT

A tape loading/unloading arrangement for use in a magnetic recording and/or reproducing apparatus, such as an 8 mm video cassette recorder, includes a pair of tape guides which pull a portion of a tape out of a tape cassette so as to extend it around a tilted guide cylinder. An improvement is made to the tape guide which comprises a support plate, an upright post perpendicularly mounted on the support plate, a slanted post mounted on the support plate adjacent the upright post for movement closely adjacent a surface of the guide cylinder, and an auxiliary post movably mounted on the support plate and adapted to be located, during the movement of the support plate between home- and operating-positions, in front of a common tangent face to the upright post and the slanted post, which common tangent face is located on the side of said upright and slanted posts facing the operating-position, but is located, when the support plate terminates at the operating-position, behind the common tangent face.

10 Claims, 19 Drawing Figures

TAPE LOADING/UNLOADING ARRANGEMENT FOR MAGNETIC RECORDING AND/OR REPRODUCING APPARATUS

BACKGROUND OF THE INVENTION

1. Field of the invention

The present invention relates to a video tape recorder and, more particularly, to an improvement of a tape loading/unloading arrangement for use in an 8 mm tape video tape recorder.

2. Description of the Prior Art

One prior art tape loading system employed in the VHS video tape recorder is known as an M-loading system, wherein a tape portion pulled out from the tape cassette is extended partially around a guide cylinder, which is provided with one or more magnetic heads. The tape is pulled out by a pair of tape guides which are first inserted into a cassette through an opening formed therein. Then, the tape guides move in the respective grooves that extend along the side of guide cylinder, thereby applying the tape portion on the guide cylinder for a predetermined angle. The M-loading system of this general type is shown, for example, in U.S. Pat. Nos. 4,115,825 and 4,452,407.

The above described M-loading system employed in an 8 mm type video tape recorder, according to the prior art, is further explained in connection with FIGS. 1, 2a, 2b, 2c and 2d below.

A pair of tape guides 4 are held in the home-position, initially. When a tape cassette 1 is properly mounted in the tape recorder, tape guides 4 are placed inside an opening 3 formed in cassette 1. Since cassette 1 is for an 8 mm tape, opening 3 is relatively small and, therefore, the radius of the curvature of grooves 5 is very small. A pair of pivotal levers V rotate to raise the portion tape off of the cassette. Then, when tape guides 4 are moved from the home-position by a suitable driving means (not shown) along the respective grooves 5, tape guide 4 catch the tape portion 2 and pull it out of the cassette. When tape guides 4 are moved to the operating-position, in which tape guides 4 are located at the upper ends (FIG. 1) of the respective guide grooves 5 and they are engaged with stoppers 7, the tape portion pulled out of the cassette is tightly held against a tilted guide cylinder 6 in a predetermined angled relationship with the axial direction of the tilted guide cylinder 6.

Figure 1:
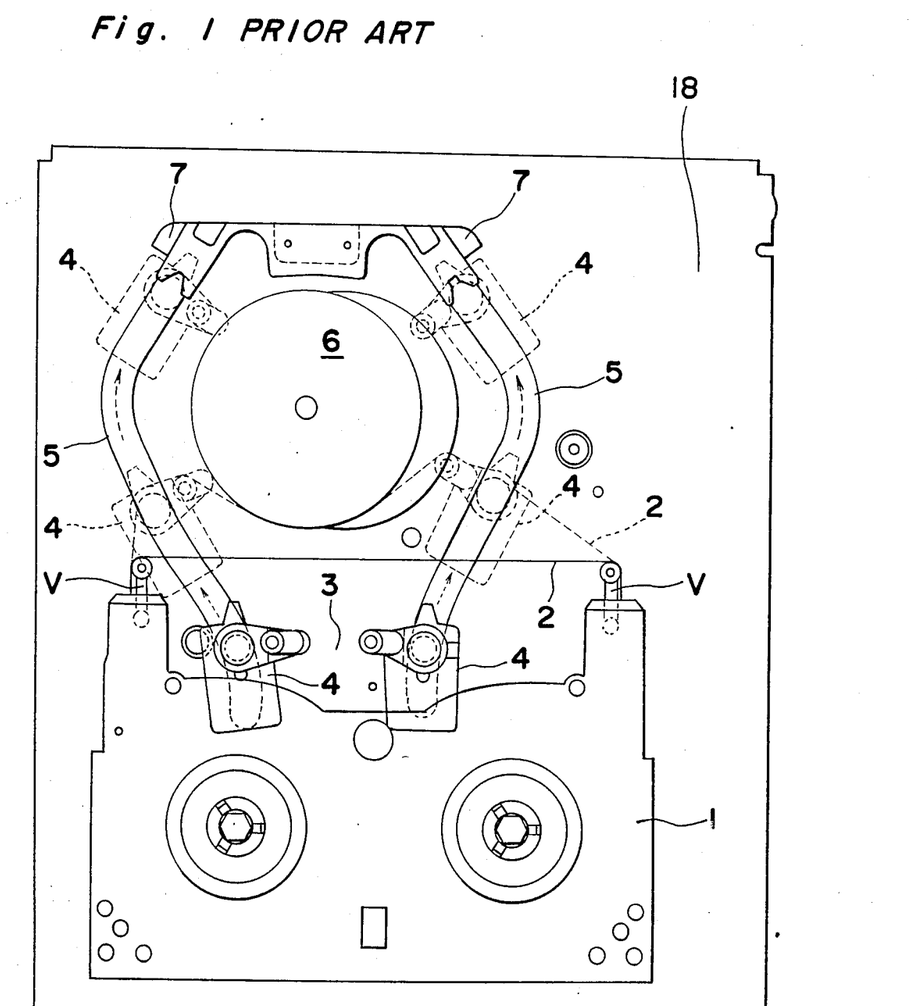
FIG. 1 is a diagrammatic view of a tape loading/unloading arrangement according to the prior art.

Referring to FIGS. 2a–2d, tape guide 4 located at the left-hand side in FIG. 1 is shown in different viewing angles, and which includes an upright post 8 and a slanted post 9 which are mounted on a slider 10. Post 8 is defined by a roller portion 13 having flanges 11 and 12 at its opposite ends and a support 14 for supporting the roller. The height of post 8 can be adjusted by turning the post 8. Then, post 8 is held in the adjusted position by tightening a screw 15. Support 14 engages a stopper 7 (FIG. 1) so as to properly locate tape guide 4 when it is moved to the end of the corresponding groove 5.

Figure 2A:
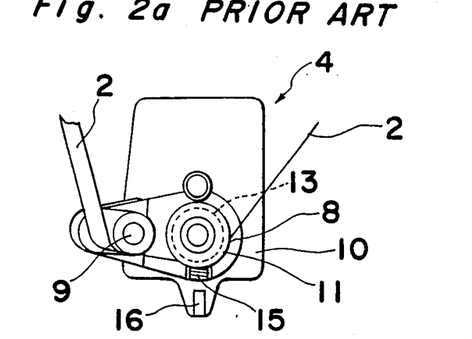
FIGS. 2a, 2b, 2c and 2d are a top plan view, front elevational view, side elevational view and bottom view, respectively, of a tape guide according to the prior art.
Figure 2B:
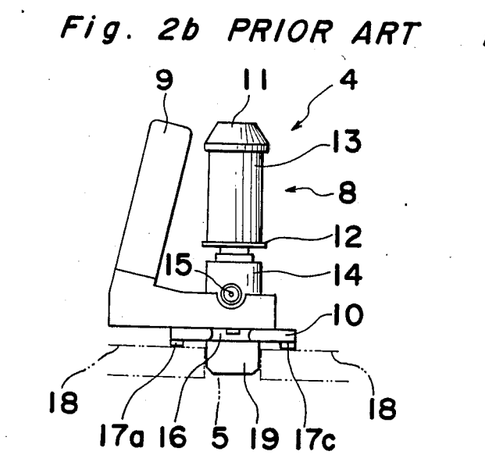
Figure 2C:
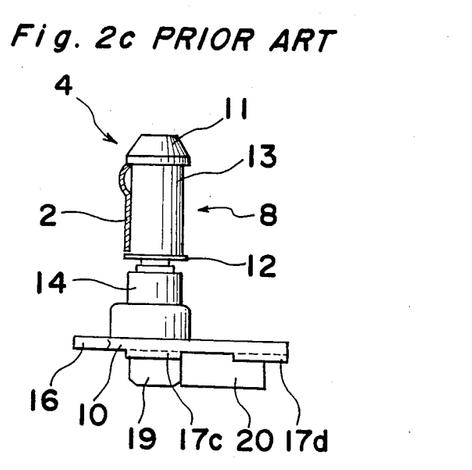
Figure 2D:
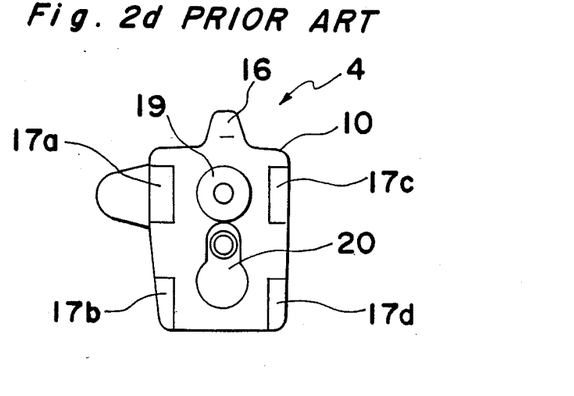

Slider 10 has a front projection 16 extending in the direction of forward movement of slider 10 and four leg projections 17a, 17b, 17c and 17d extending on the bottom face of slider 10 at four corners thereof for sliding contact with the chassis 18, indicated by a broken line in FIG. 2b. As well as support 14, front projection 16 engages stopper 7 to locate tape guide 4 when it is moved to the end of the corresponding groove 5. A pair of engagement-projections 19 and 20 extend downwardly from the bottom face of slider 10 for engagement with guide groove 5, and is connected with a driver means (not shown) which provides a moving force to guide 4.

Since the tape portion is wound on tilted guide cylinder 6, some twisting force is applied to the running tape so that the tape can not follow the original path on the tilted guide cylinder. Thus, the tape tends to change its path during the movement, resulting in unstable movement of the tape. To keep the tape following the orignal path on the tilted guide cylinder, post 9, tilted in a predetermined angle, is provided on each tape guide 4. The employment of such a slanted post 9 is disclosed in Japanese Patent Publication No. 58-27580, issued June 10, 1983 and assigned to Matsushita Electric Industrial Co., Ltd. When such a slanted post 9 is employed, stable movement of the tape can be realized after the tape is completely loaded, that is, properly wound on the tilted guide cylinder 6.

However, the employment of slanted post 9 gives rise to another problem that occurs during the loading of the tape on tilted guide cylinder 6 or during the unloading of the tape from cylinder 6, as explained below.

During the loading of the tape and particularly in the case of 8 mm tape video tape recorder, tape guide 4 moves from its home-position to the operating-position, and during which slanted post 9 engages the tape, whereby the tape is undesirably twisted by the tilted post. Thus, the tape receives a force in its widthwise direction. For example, when slanted post 9, shown in FIG. 2b, engages and pulls the tape from the cassette, the tape receives a force in the upward direction. Accordingly, the upper edge of the tape rubs against flange 11, which may cause undesirable damage to the tape. The same problem arises during the unloading of the tape, that is, when tape guide 4 moves from its operating-position to the home-position.

The above described problem is further described with reference to FIGS. 9 and 10.

Figure 9:
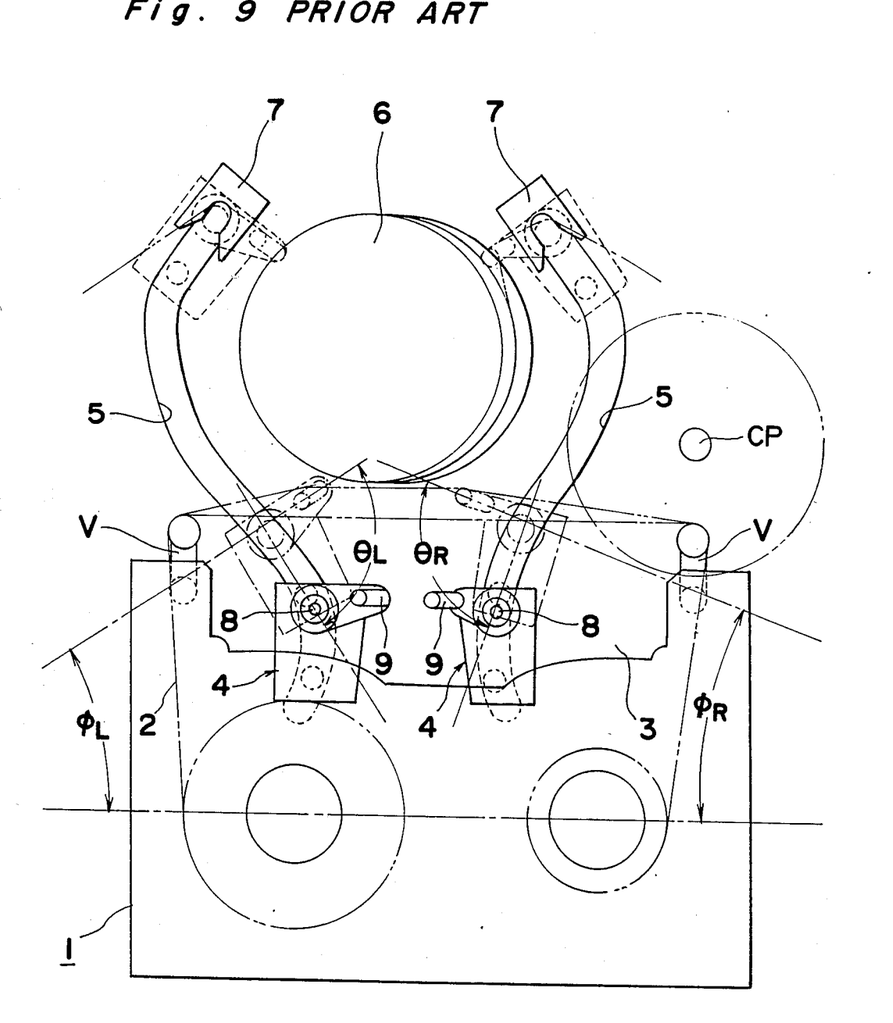
FIG. 9 is a diagrammatic view of a tape loading/unloading arrangement according to the prior art.
Figure 10:
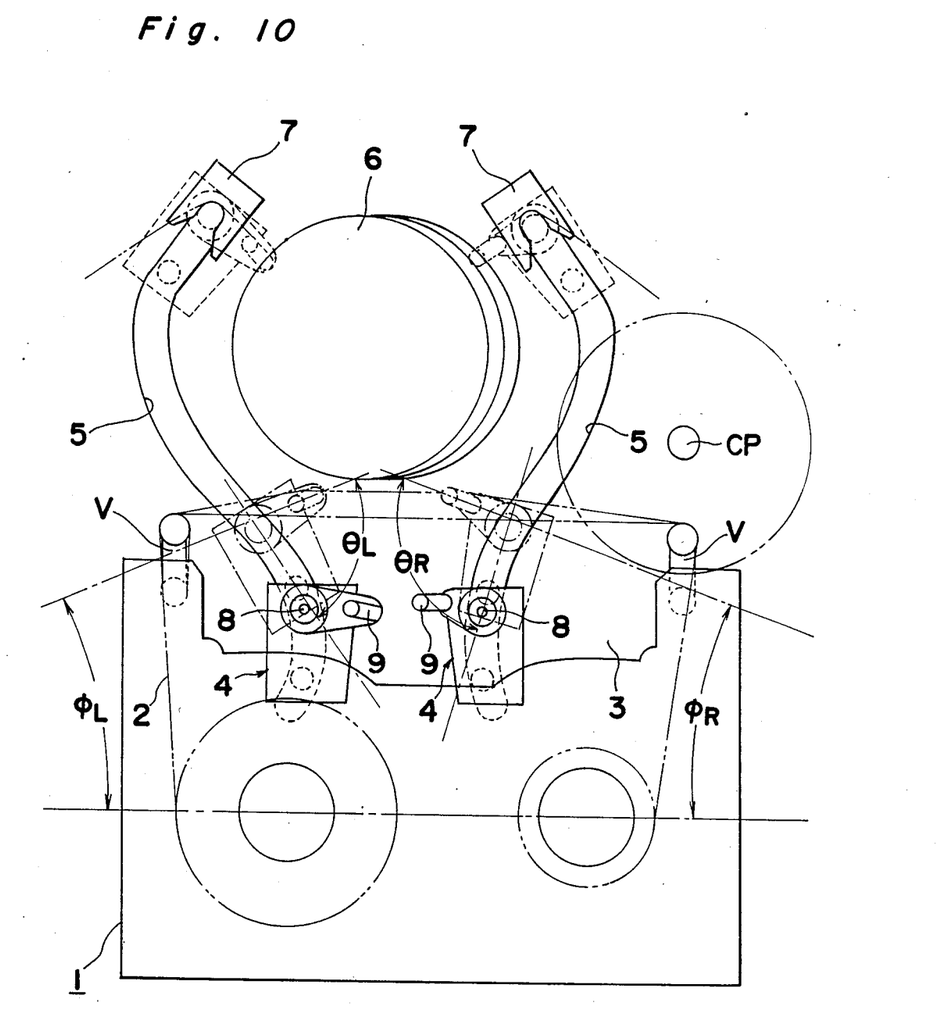
FIG. 10 is a diagrammatic view showing an improvement of the arrangement of FIG. 9.

According to the prior art tape loading arrangement such as shown in FIG. 9, with respect to the tape guide provided on the left-hand side, an angle $\theta L$ contained between a line extending between the centers of tape reels and a line containing the axis of slanted post 9 when viewed in FIG. 9, which is located at a position slightly touching the tape, is relatively large. When the angle $\phi L$ becomes greater, slanted post 9 contacts the tape in a more slanted manner, thereby producing a force in the widthwise direction of the tape. Such a widthwise force can be reduced by reducing the tilting angle of the tilted post itself or by reducing an angle $\phi L$ contained between the line containing slanted post 9 and the line representing the direction of movement of the tape guide 4. Since the tilting angle of the tilted post is determined by the angle of guide cylinder 6, the tilting angle of the post can not be changed.

An attempt has been made by one of the present inventors to change the angle $\theta L$. Generally, as shown in FIG. 9, the angle $\theta L$ is about 90°, and is changed to about 80°, as shown in FIG. 10. Accordingly, the angle $\phi L$ is made smaller than that in FIG. 9.

In this respect, the above described problem of producing unwanted widthwise force may be reduced to some degree, but another problem arises if the angle $\theta L$ is made less than 80°. That is, as the angle is made less than 80°, it is necessary to bring tape guide 4 closer to guide cylinder 6 so as to ensure the contact between slanted post 9 and guide cylinder 6. However, if tape guide 4 is brought too close to guide cylinder 6, the edge of the tape guide 4 may undesirably scrape the face of guide cylinder 6, resulting in damage of the magnetic head.

A similar problem may arise for the tape guide provided on the right-hand side. If so, the same rearrangements may be done to the tape guide and its associated parts, if necessary. However, if the guide grooves to the right and left of the guide cylinder are asymmetric to each other, such as shown in FIG. 9, where capstan CP is located on the right-hand side of the cylinder, the angle $\phi R$ is already sufficiently small. Therefore, it is not necessary to further adjust the tape guide and its associated posts.

SUMMARY OF THE INVENTION

The present invention has been developed with a view to substantially solving the above described disadvantages and has for its essential object to provide an improved tape loading/unloading arrangement for use in a video tape recorder.

It is also an essential object of the present invention to provide a tape loading/unloading arrangement of the above described type which provides no force to the tape in the widthwise direction of the tape, during the loading or unloading.

In accomplishing these and other objects, a tape loading/unloading arrangement according to the present invention has a tape guide which comprises a support plate, an upright post perpendicularly mounted on the support plate, a slanted post mounted on the support plate adjacent the upright post for movement closely adjacent a surface of the guide cylinder, and an auxiliary post movably mounted on the support plate and adapted to be located, during the movement of the support plate between the home- and operating- positions, in front of a common tangent face to the upright post and the slanted post, which common tangent face is located on the side of said upright and slanted posts facing the operating position, but is located, when the support plate terminates at the operating position, behind the common tangent face.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DESCRIPTION OF THE PREFERRED EMBODIMENTS

Referring to FIGS. 3, 4a, 4b, 4c and 4d, a tape guide according to a first embodiment of the present invention is shown. The tape guide comprises an upright post 8 and a slanted post 9 which are mounted on a slider 10. Upright post 8 is defined by a roller portion 13 having flanges 11 and 12 at its opposite ends and a support 14 for supporting the roller. The height of post 8 can be adjusted by turning the post 8. Then, post 8 is held in the adjusted position by tightening a screw 15. Support 14 engages a stopper 7 (FIGS. 5a and 5b) so as to properly locate the tape guide when it is moved to the end of the corresponding groove 5.

Slider 10 has a front-projection 16 extending in the direction (arrow A) of forward movement of slider 10 and four leg-projections 17a, 17b, 17c and 17d extending on the bottom face of slider 10 at four corners thereof for sliding contact with the chassis. As well as support 14, front-projection 16 engages stopper 7 to locate the tape guide at the operating-position. A pair of engagement-projections 19 and 20 extend downwardly from the bottom face of slider 10 for engagement with the guide groove, and is connected with a drive means (not shown) which provides a moving force to the tape guide.

According to the present invention, the tape guide further comprises an auxiliary post 21 mounted on a movable element 22.

Figures 3, 4A:
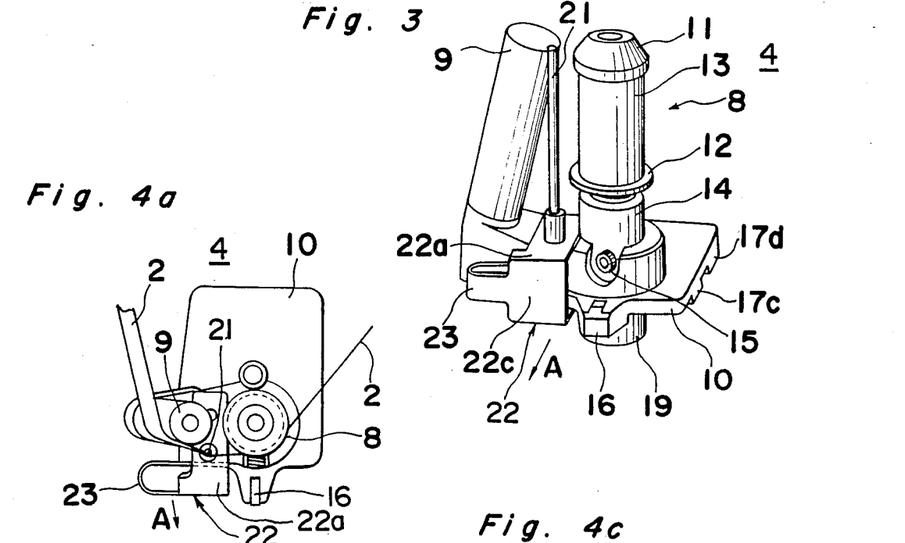
FIG. 3 is a perspective view of a tape guide according to a first embodiment of the present invention.
FIGS. 4a, 4b, 4c and 4d are a top plan view, front elevational view, side elevational view and bottom view, respectively, of the tape guide of FIG. 3.
Figure 6:
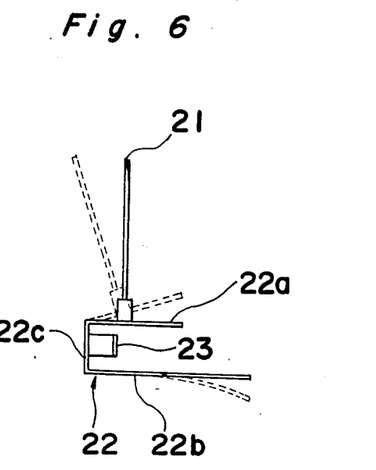
FIG. 6 is a side elvational view of an element provided with an auxiliary post, according to the present invention.

Referring to FIG. 6, movable element 22 is defined by a top plate 22a, a bottom plate 22b and a side plate 22c. Auxiliary post 21, which is parallel to upright post 8, is mounted firmly and perpendicularly on top plate 22a. Top plate 22a and bottom plate 22b extend substantially parallel to each other, and side plate 22c extends between the edges of top and bottom plates 22a and 22b. Top, bottom and side plates are formed by bending a plate, as indicated by a dotted line in FIG. 6. Movable element 22 further has a leaf spring plate 23 extending from the edge of side plate 22c. As shown in FIG. 4a, leaf spring plate 23 is bent in a shape of a U, so that its end portion is located in a space between top and bottom plates 22a and 22b.

Figures 4B, 4C, 4D:
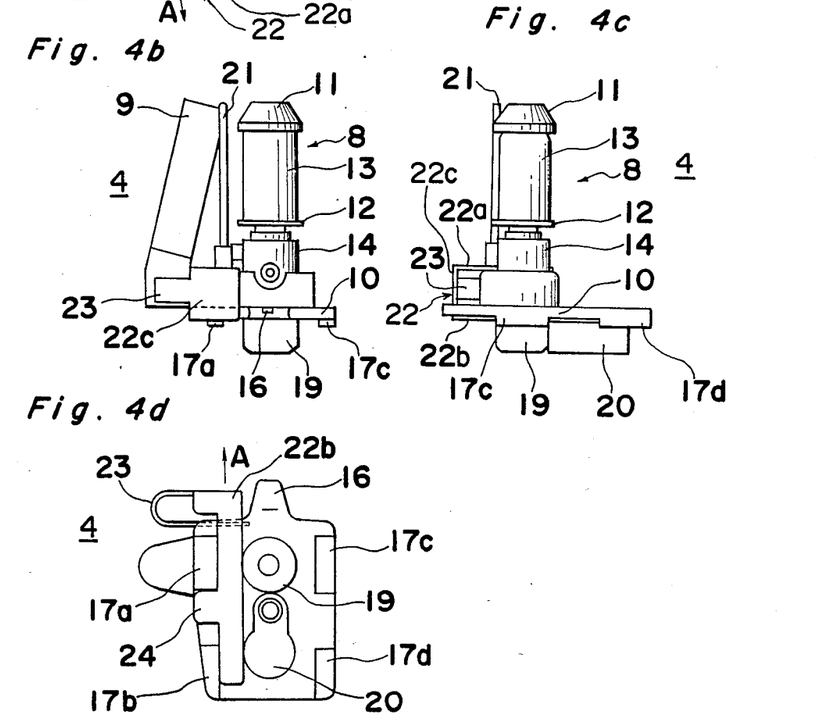

As shown in FIG. 4d, bottom plate 22b is defined by an elongated portion and a projecting portion 24 projecting at about the center of the elongated portion. The elongated portion is slidingly held between leg-projection 17a and engagement-projection 19 and also between leg-projection 17b and engagement-projection 20. Projecting portion 24 is located in a space defined between leg-projections 17a and 17b. The end portion of leaf spring plate 23 is held in contact with a front edge of slider 10.

Normally, by the resiliency of leaf spring plate 23, movable element 22 is biased forward and is held in a projected position as indicated in FIGS. 4a-4d. In such a position, projecting portion 24 is held in contact with leg-projection 17a (FIG. 4d). When movable element 22 is in the projected position, auxiliary post 21 is located in front of a common tangent face to upright post 8 and slanted post 9, which common tangent face is located on the side of posts 8 and 9 close to front-projection 16.

Figure 5A:
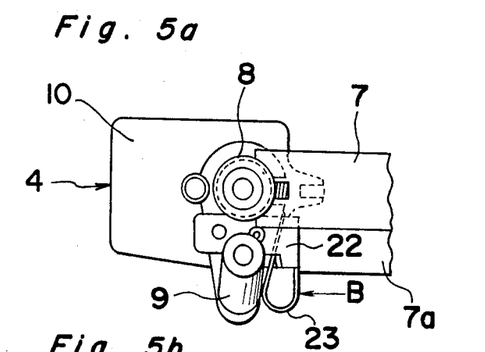
FIGS. 5a and 5b are top plan view and side elevational view of the tape guide of FIG. 3, particularly showing an engaged position with a stopper.
Figure 5B:
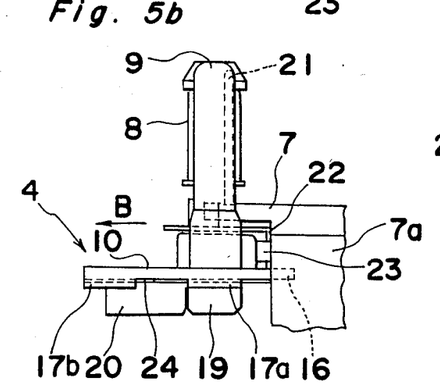

As shown in FIGS. 5a and 5b, when the tape guide is moved to the operating-position, side plate 22c of movable element 22 contacts a block 7a provided in stopper 7. Thus, element 22 is pushed back in a direction B with respect to slider 10 and is held in a retracted position. In such a position, projecting portion 24 is held in contact with leg-projection 17b (FIG. 4d). When movable element 22 is in the retracted position, auxiliary post 21 is located behind the above-mentioned common tangent face, such as between upright post 8 and tilted post 9.

Next, the operation of the tape guide according to the first embodiment will be described.

A pair of tape guides are held in the home-position, initially. Under this condition, movable element 22 is held in the projected position. Then, when a tape cassette is properly mounted in the tape recorder, the tape guides, particularly upright post 8, slanted post 9 and auxiliary post 21, are placed inside an opening 3 formed in the cassette. Then, when the tape guides start to move from the home-position by a suitable driving means (not shown) along the respective guide grooves, the tape guides catch the tape portion 2 and pull it out of the cassette. According to the present invention, the tape first contacts auxiliary post 21, and then, slanted post 9 and upright post 8 almost at the same time. In other words, according to the present invention, during the movement of the tape guide from its home-position to the operating-position, tape 2 is held in contact with auxiliary post 21, upright post 8 and slanted post 9. Accordingly, the winding angle of the tape on slanted post 9 is reduced, when compared with the prior art tape guide. Thus, the contact pressure of the tape on slanted post 9 is not as high as that in the prior art tape guide. Thus, although the tape receives a force in its widthwise direction, it is very weak. Therefore, there will be no fear of causing undesirable damage to the tape edge.

Then, when the tape guides are moved to the operating-position, in which the tape guides are engaged with corresponding stoppers 7, movable element 22 moves to the retracted position so that the auxiliary post 21 no longer contacts the tape. Thus, the tape portion pulled out from the cassette is wound on upright post 8 and slanted post 9 on one tape guide and similarly on the other tape guide, while a tape portion extending between two tape guides is tightly held against a tilted guide cylinder in a predetermined angled relationship with the axial direction of the tilted guide cylinder.

Figure 7:
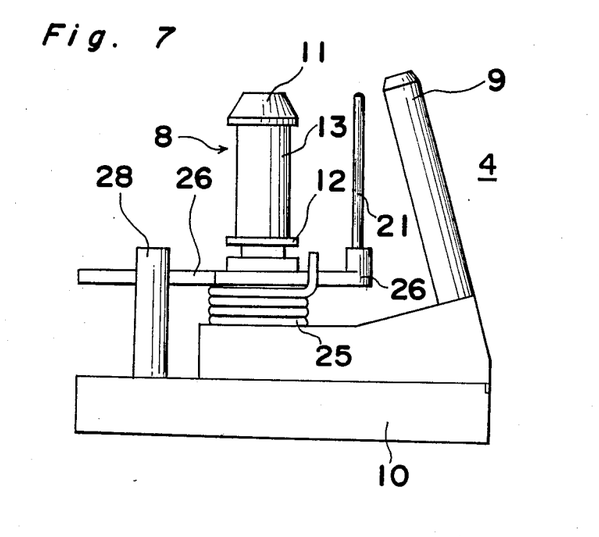
FIG. 7 is a side elevational view of a tape guide according to a second embodiment of the present invention.

Referring to FIG. 7, a tape guide according to a second embodiment of the present invention is shown. Instead of movable element 22, auxiliary post 21 is firmly mounted on a lever 26 which is rotatably mounted on upright post 8, such as on cylindrical support 14 (FIG. 3). A coil spring 25 is mounted on cylindrical support 14 with its one end connected to lever 26 and the other end connected to post 8 or to slider 10 so as to bias lever 26. The rotation of lever 26 is restricted by a pin 28 firmly mounted on slider 10. Thus, normally, lever 26 is located in the projected position in which auxiliary post 21 is positioned ahead of the above-mentioned common tangent face. When an external force is applied to lever 26, it turns to the retracted position in which auxiliary post 21 is positioned behind the above-mentioned common tangent face, and such as between upright post 8 and slanted post 9.

Next, the operation of the tape guide according to the second embodiment will be described in connection with FIGS. 8a, 8b and 8c, in which coil spring 25 is not shown for the sake of brevity.

Figure 8A:
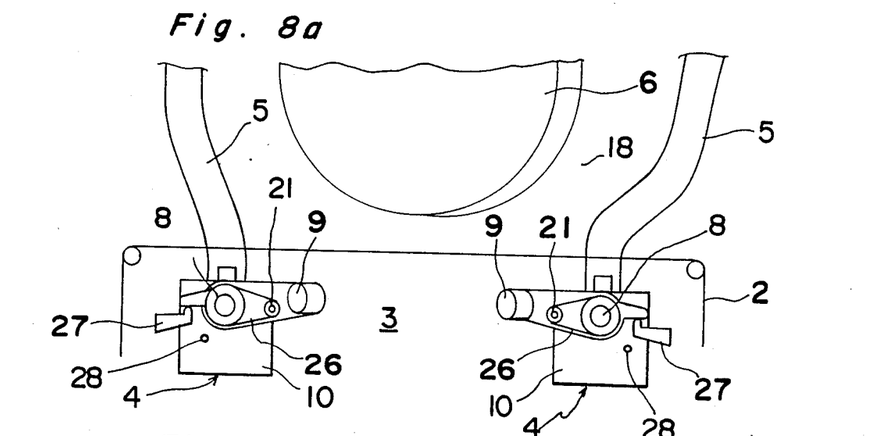
FIGS. 8a, 8b and 8c are diagrammatic views showing an operation of the tape guide of the second embodiment.
Figure 8B:
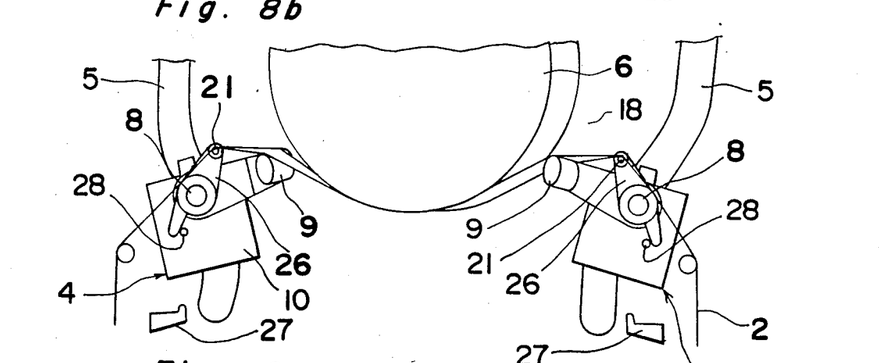

Referring to FIG. 8a, a pair of tape guides, according to the second embodiment, are held in the home-position. Under this condition, lever 26 is held in the retracted position by the engagement of lever 26 with a hook 27 provided on the chassis of the video tape recorder. As apparent from FIG. 8a, the tape guide shown on the left-hand side has a lever 26 which rotates clockwise to change its position from a projected position to a retracted position. On the contrary, the tape guide shown on the right-hand side has a lever 26 which rotates counterclockwise to change its position from a projected position to a retracted position.

Then, when a magnetic tape cassette is properly mounted in the tape recorder, the tape guides, particularly upright post 8, slanted post 9 and auxiliary post 21, are placed inside an opening 3 formed in the cassette. Then, when the tape guides start to move from the home-position by a suitable driving means (not shown) along the respective guide grooves, lever 26 in each tape guide rotates, as it moves away from hook 27, thereby placing lever 26 in the projected position. Thus, auxiliary post 21 contacts the tape, and then, slanted post 9 and upright post 8 contact the tape almost at the same time. Then, as shown in FIG. 8b, during the movement of each tape guide from its home-position to the operating-position, the tape is held in contact with auxiliary post 21, upright post 8 and slanted post 9, in the same manner as described above.

Figure 8C:
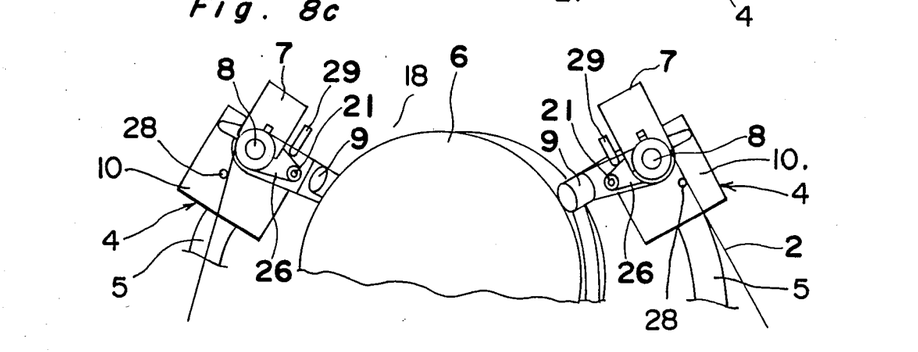

Then, as shown in FIG. 8c, when the tape guides are moved to the operating-position, in which the tape guides are engaged with corresponding stoppers 7, lever 26 contacts a pin 29 provided in each stopper. Thus, lever 26 rotates to the retracted position so that the auxiliary post 21 is located between upright post 8 and slanted post 9. Thus, the tape portion pulled out from the cassette is wound on upright post 8 and slanted post 9 on one tape guide and similarly on the other tape guide, while a tape portion extending between two tape guides is tightly held against a tilted guide cylinder in a predetermined angled relationship with the axial direction of the tilted guide cylinder.

According to the present invention, since auxiliary post 21 pushes a tape portion extending between upright post 8 and slanted post 9 during the tape guide movement between the home-position and operating-position, the winding angle of the tape on slanted post 9 is reduced, thereby reducing the contact pressure on the tape on slanted post 9. By these effects, the tape receives a very weak force in its widthwise direction. Thus, the upper edge of the tape will not be damaged, both during the loading and unloading of the tape.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of the appended claims.

What is claimed is:

1. In a tape loading/unloading arrangement for applying a magnetic tape onto a tape engaging surface of a guide cylinder having an axis tilted relative to the plane of the tape being applied and a slanted post for contacting and guiding said tape to said guide cylinder comprising:

an auxiliary post having a tape engaging surface for contacting said tape during the initial application of said tape onto said tape engaging surface of said guide cylinder, thereby reducing the force exerted on said tape due to said slanted post in the widthwise direction of said tape; and means for releasing said auxiliary post from contact with said tape at the completion of said initial application of said tape onto said tape engaging surface of said guide cylinder.

2. In a tape loading/unloading arrangement for use in loading and unloading magnetic tape from and back into a cassette in a magnetic tape recorder having a guide cylinder mounted on an axis tilted relative to the plane of the tape to be loaded and unloaded and having a tape engaging surface, a pair of tape guide means for movement between a home position, in which the tape is unloaded from said cassette to an operating position, in which the tape is loaded onto said tape engaging surface of said guide cylinder such that a tape portion is pulled out from said cassette partly wound onto said surface of said guide cylinder, an improvement wherein said tape guide means comprises:

support means for sliding movement between said home position and said operating-position;

an upright post mounted on said support means in a perpendicular relationship to a plane of movement of said support means, said upright post having a tape engaging surface thereon;

a slanted post mounted on said support means adjacent said upright post, said slanted post moving closely adjacent the surface of said guide cylinder and having a tape engaging surface thereon;

an auxiliary post movably mounted on said support means and located, during the movement of said support means between said home-position and said operating-position, in front of the tangent between said tape engaging surface of said upright post and said tape engaging surface of said slanted post, which tangent is located on the side of said upright and slanted posts facing said operating position;

and means for moving said auxiliary post, when said support means terminates at said operating position, to a location behind said tangent.

3. A tape loading/unloading arrangement as claimed in claim 2, wherein said auxiliary post is located, when said support means is positioned at said home position, behind said tangent.

4. In a tape loading/unloading arrangement for use in a magnetic tape recorder having a guide cylinder having an axis tilted relative to the plane of the tape being loaded, said guide cylinder having a tape engaging surface thereon, a pair of tape guide means for movement between a home-position, in which the tape is unloaded with respect to said guide cylinder, and an operating-position, in which the tape is loaded on said tape engaging surface of said guide cylinder, said tape being pulled out from a cassette and partly wound on said tape engaging surface of said guide cylinder when said tape is loaded, an improvement wherein said tape guide means comprises:

support means slidingly movable between said home-position and said operating-position;

an upright post mounted on said support means with its axis perpendicular to plane of sliding movement of said support means, said upright post having a tape engaging surface thereon;

a slanted post mounted on said support means adjacent said upright post with its axis slanted to said plane of sliding movement said slanted post moving closely adjacent to the surface of said guide cylinder when said tape is loaded on said guide cylinder, said slanted post having a tape engaging surface thereon;

an auxiliary post mounted on said support means and having a tape engaging surface thereon; and moving means for moving said auxiliary post relative to said support means, said moving means including means for positioning said auxiliary post, during the movement of said support means between said home-positioned and operating-position, in front of the tangent between said tape engaging surface of said upright post and the tape engaging surface of said slanted post, which tangent is located on the side of said upright and slanted post facing said operating position, and for positioning said auxiliary post, when said support means terminates at said operating-position, behind said tangent.

5. A tape loading/unloading arrangement as claimed in claim 4, further comprising a stop means for stopping said support means when said support means is moved to said operating-position.

6. A tape loading/unloading arrangement as claimed in claim 5, wherein said moving means engage with said stop means when said support means terminates at said operating- position thereby locating said auxiliary post behind said tangent.

7. A tape loading/unloading arrangement as claimed in claim 4, wherein said support means is a slider.

8. A tape loading/unloading arrangement as claimed in claim 7, wherein said moving means is mounted on said slider.

9. A tape loading/unloading device as claimed in claim 4, wherein said moving means is a movable element.

10. A tape loading/unloading arrangement as claimed in claim 4, wherein said moving means is a spring biased lever rotatably mounted on said upright post.

* * * * *